United States Patent [19]
DeRoche

[11] Patent Number: 5,638,860
[45] Date of Patent: Jun. 17, 1997

[54] CONTROL VALVE FOR INITIAL HYDRAULIC SURGE PRESSURE

[75] Inventor: Clarence J. DeRoche, Houma, La.

[73] Assignee: Hydraulic Impulse Controls, Inc., Houma, La.

[21] Appl. No.: 491,726

[22] Filed: Jun. 19, 1995

[51] Int. Cl.$^6$ ................................................ F16K 21/10
[52] U.S. Cl. ........................ 137/493.8; 137/512.1; 137/514.5
[58] Field of Search .................. 137/493.8, 512.1, 137/514.5; 29/890.124; 212/287, 288

[56] References Cited

U.S. PATENT DOCUMENTS 4,051,864 10/1977 Iwatsuki ........................... 137/514.5
4,398,558 8/1983 Cadeddu ........................... 137/514.5

Primary Examiner—Edward K. Look
Assistant Examiner—Christopher Verdier
Attorney, Agent, or Firm—George A. Bode; Michael L. Hoelter

[57] ABSTRACT

A surge pressure control valve for blocking surge pressures that may occur in a fluid line. This surge pressure control valve contains a fluid biased plunger therein that retracts upon the application of fluid pressure. However, the rate of retraction of this plunger is limited to the rate at which the fluid bias is released by flowing through a relief opening controlled by a needle valve. As this plunger is allowed to retract, it uncovers a passageway connecting the inlet port to the outlet port, thereby permitting fluid to flow through the valve. By such construction, this plunger does not react immediately to the application of pressure, instead, the plunger only gradually retracts (thereby only gradually uncovering the passageway) after fluid is first forced through the relief opening. Thus, this plunger serves the purpose of dampening the effect of any surge pressure that may arise in the line.

14 Claims, 3 Drawing Sheets

CONTROL VALVE FOR INITIAL HYDRAULIC SURGE PRESSURE

BACKGROUND OF THE INVENTION

1. Field of the Invention

This invention pertains to hydraulic valves in general and more particularly to the elimination of any pressure surges that may occur in hydraulic lines in order to gradually provide flow through the valve.

2. General Background

The use of hydraulic valves to regulate pressure or fluid flow is well known in the art. Such valves are needed for the operation of hydro-mechanical equipment and the like which are used in a variety of industries. However, a problem associated with the use of such equipment concerns the high pressure line surges that are caused by the opening and closing of valves or other control devices. Such opening and closing can cause instantaneous reactions of the hydraulic equipment which is not always desirable. Also, such surges, if too great, can damage the motors, cylinders, or piping of such equipment, another undesirable feature.

U.S. Pat. No. 3,739,807 to Landrus et al. discloses a hydraulic valve that is used to regulate pressure in automatic transmissions in order to prevent any abrupt engagement thereof. As shown therein, fluid under pressure enters the valve via line 16 and flows into chamber 26. Such fluid eventually causes valve element 38 to move to the right while compressing spring 56. This fluid also passes through orifice 50 and opening 65 to eventually cause plug element 66 to also move to the right against spring 72. When plug 66 abuts stop 76, the equal pressure on both ends of valve element 38, along with the force of spring 56, causes this valve element 38 to return or snap back to its original position thereby concluding the regulation of the applied pressure or trim cycle.

U.S. Pat. No. 4,030,522 to Heiser is an example of a hydraulic valve used to control the amount of pressure fluid flowing therethrough. In this case, a variable throttle 28 is inserted between a pressure fluid inlet passage 23 and pressure fluid outlet passages 26 and 27 in order to create a pressure difference between the two. This pressure difference is generally maintained by inserting a spring biased valve 43 between the inlet passage 23 and adjacent by-pass passage 25.

U.S. Pat. No. 2,476,720 to Gardiner is an example of another flow regulating valve which utilizes an adjustable throttle 54 for consistently driving machine tools regardless of the load thereon. In this version, a fluid is pumped via line 38 into inlet port 40 which is in communication with throttle 54 via passages 63, 71, 74, and 78. Throttle 54 is, in turn, in fluid communication with spring biased blocking valve 56 which blocks outlet passage 104. When sufficient fluid pressure builds-up in front of blocking valve 56 (as controlled via throttle 54 and compensating valve 52), such fluid is gradually released into outlet passage 104.

U.S. Pat. No. 2,164,669 to Thomas discloses a pressure relief valve that is used in power transmission systems. This valve incorporates a piston 42 that is exposed to fluid under pressure via conduit 32. Normally, piston 42 is in the closed position, but at some pressure value, piston 42 is moved to the right against the bias of spring 44. Piston 42 then remains in this open position until sufficient pressure is created behind piston 44 via by-pass 48 to assist spring 44 in closing piston. This valve is configured such that the opening pressure of piston 44 can be changed or adjusted without affecting its closing pressure. Likewise, the closing pressure of piston 44 can be changed or adjusted without affecting its opening pressure.

U.S. Pat. No. 4,682,531 to Mayer discloses a control valve that regulates the rate of fluid flow. This valve limits fluid flow to a hydraulic motor during start-up so as not to induce excessive loads thereon. It consists of a spring biased poppet 50 that is located intermediate fluid inlet 32 and fluid outlet 34. This poppet 50 is normally biased closed, but upon the application of pressure via inlet 32, poppet 50 is moved from its seat thereby allowing some of this fluid to pass via channel 80 and flow toward outlet 34.

U.S. Pat. No. 4,051,864 to Iwatsuki discloses a flow regulator for use in controlling fluid flow during the operation of such devices as fork truck lift mechanisms. This regulator dampens flow rate in order to maintain a consistent flow notwithstanding changes in load conditions. A dashpot is utilized to dampen such flow.

U.S. Pat. No. 3,086,551 to Gordon discloses a hydraulic relief valve which may be used to prevent hydraulic fluid pressure from exceeding a predetermined value. It operates by inserting a valve body 24 intermediate the inlet 14 and exit 16 fluid openings. This valve body 24 is normally biased closed via the hydraulic pressure in cylinder 44 and the bias of spring 68. However, when the pressure in inlet 14 is sufficient enough to overcome such bias, valve body 24 becomes unseated thereby permitting fluid flow to outlet 16.

As can be seen, there are a variety of different methods of controlling hydraulic pressures. All of these devices incorporate a labyrinth or maze of internal passageways which contain many moving parts. Their construction and assembly is thus time-consuming and expensive and they also require a high degree of maintenance to insure proper operation. It is thus an object of this invention to provide a flow control valve that is relatively inexpensive to construct and requires few moving parts.

Another object of this invention is to provide a new design for a valve that controls the initial surge pressure occurring in hydraulic lines.

A further object of this invention is to provide such control so as to either gradually provide flow through the valve or gradually provide no flow through the valve in the reverse flow situation.

Yet another object of this invention is to employ a spring biased plunger in conjunction with controlled fluid dampening to effect such pressure regulation.

Still another object of this invention is to devise a control valve for use on cranes and the like which will aid the operation or movement of its crane, boom and winch.

Another object of this invention is to provide a valve that can be used in pairs due to the movement of the crane's components in opposite directions.

Yet another object of this invention is to prevent erratic movement of the hydro-mechanical equipment to which the invention is attached.

SUMMARY OF THE PRESENT INVENTION

The preferred embodiment of the apparatus of the present invention solves the aforementioned problems in a straight-forward and simple manner. This invention pertains to a fluid pressure surge protector that incorporates a valve body having an inlet port and associated bore and a separate, off-set outlet port and associated bore. One passageway within this valve body selectively couples or connects this inlet bore to the outlet bore. A plunger assembly, in fluid connection with the inlet bore, is configured to selectively block this passageway between the inlet and outlet bores. Secured to this plunger assembly is a spring assembly which normally biases the plunger assembly to the blocking position. A fluid-filled chamber is configured underneath this plunger assembly for receiving it therein whenever the plunger assembly is retracted to an unblocking position. This chamber contains first and second openings therein with a needle valve assembly being coupled to this first opening. Such a needle valve assembly is operated to selectively control the flow of fluid through the first opening and out the chamber whenever the plunger assembly is retracted. A check valve is coupled to the second opening and is arranged so as to permit fluid to pass therethrough and only fill the chamber thereby moving the plunger assembly to the blocking position.

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
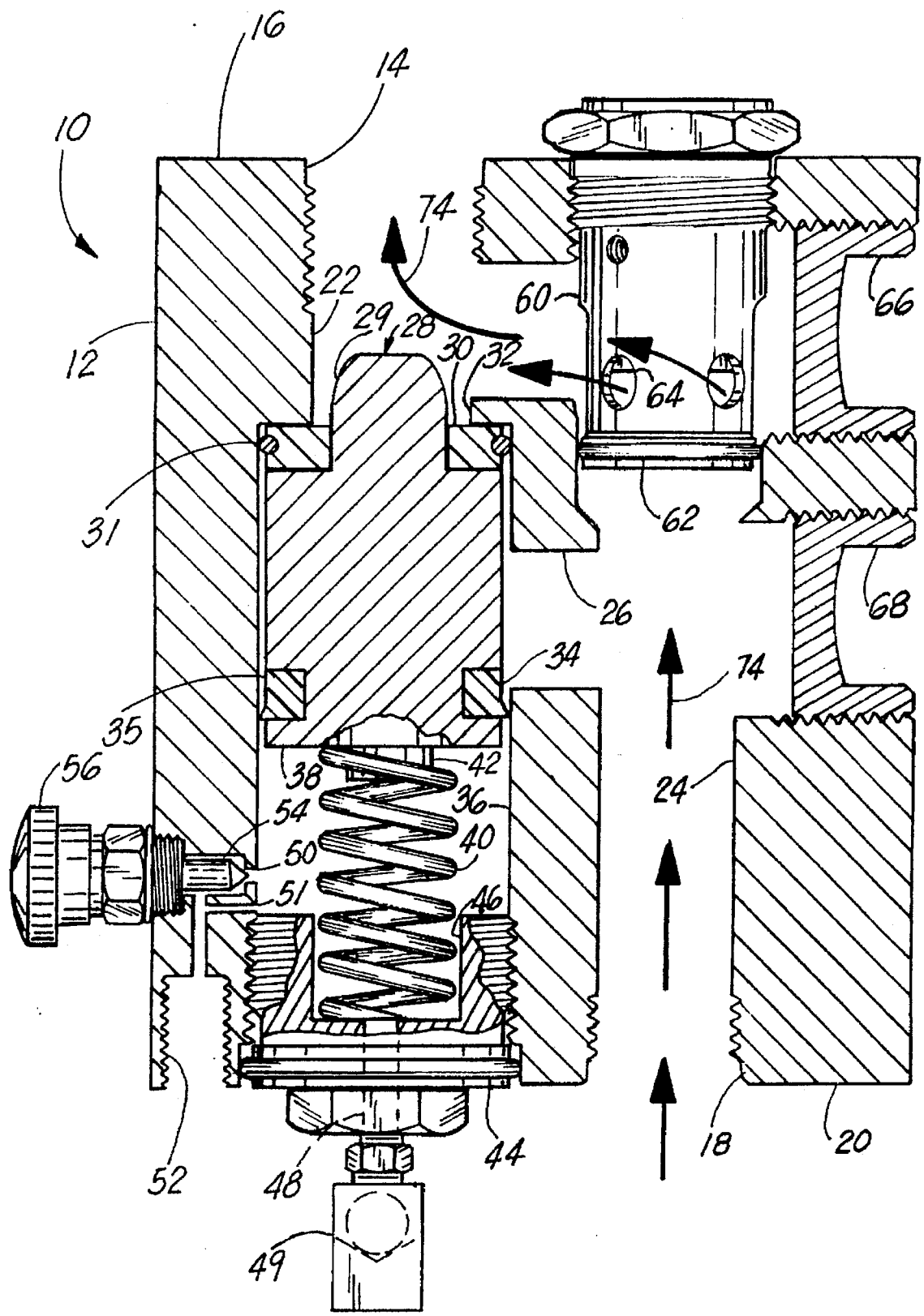
FIG. 1 is a pictorial sectional view of the invention illustrating its position under no-flow or reverse flow conditions.

Referring to FIG. 1, there is shown control valve 10 which consists of valve body or housing 12 generally constructed of a single piece of metal or other material that can withstand high internal fluid pressure loads. As shown, valve body 12 is box-like, but any desired configuration is likely. In this embodiment, valve body 12 incorporates inlet port 14 in an upper or top side 16 thereof and an outlet port 18 in a lower or bottom side 20 thereof. However, the actual location of these ports 14 and 18 in valve body 12 can vary. Also, if desired these ports 14 and 18 can be threaded (as shown) for later coupling to external conduit or hoses. Alternatively, these ports 14 and 18 can be designed to accept a press-fit or another coupling therein.

Inlet port 14 and outlet port 18 are each coupled to offset bores 22 and 24 respectively, within valve body 12. These offset bores 22 and 24 extend into valve body 12 from their respective sides 16 and 20 in a generally parallel manner. They are connected together in a mid-region of valve body 12 via transverse passage 26. However, plunger 28 in inlet bore 22 will normally be biased to block transverse passage 26 as shown.

Plunger 28 engages seat 30 in bore 22 from an underneath side thereof. This seat 30 is generally held in place within bore 22 of valve body 12 via a snap ring 31 or the like, however, any other manner of sealing opening 32 in valve body 12 is likely. As shown, a portion 29 of plunger 28 is designed to pass through both opening 32 and seat 30, but plunger 28 can also be configured to merely extend across them if desired. The actual configuration of movable plunger 28 and fixed seat 30 can vary so long as opening 32 is fully sealed such as with the assistance of a gasket or O-ring or the like.

When in this closed position of FIG. 1, plunger 28 is sized to not only block opening 32, but also block transverse passage 26. This is accomplished by installing annular seal 34 in annular groove 35 along the base of plunger 28 to seal between plunger 28 and underneath fluid-filled chamber 36. Seal 34 can be an O-ring or it can be solid, its actual configuration may vary so long as it is capable of sealing base 38 of plunger against chamber 36 as well as sealing plunger 28 around transverse passage 26.

Fluid-filled chamber 36 underneath plunger 28 in bore 22 is uniformly shaped so that seal 34 can function as planned and so that it can accommodate the up and down motion of plunger 28. Also, chamber 36 houses spring 40 therein which normally biases plunger 28 against seat 30. Spring 40 is secured at one end to nipple 42 that is secured to base 38 of plunger 28. This nipple 42 holds or secures spring 40 in place against plunger 28. The other end of spring 40 is secured to plug 44 which forms or defines the bottom of chamber 36. Generally, spring 40 will be inserted within a countersink or indentation 46 in plug 44 in order to secure spring 40 to plug 44 and to prevent it from moving laterally. In other embodiments, however, spring 40 and its related structure are not required and would be eliminated altogether, thereby further simplifying the construction of valve body 12.

Plug 44 is preferably threaded into the bore of chamber 36, but plug 44 may also be secured to valve body 12 via other connecting means that can withstand the pressures occurring within chamber 36. An inlet opening 48 extends through plug 44 so that fluid may flow therethrough in communication with chamber 36. Preferably, spring 40 will straddle inlet opening 48 and be concentric therewith. A one-way check valve 49 is secured to inlet opening 48 and is configured to only allow fluid to enter chamber 36 through opening 48. This check valve 49 is designed to prevent the release of fluid from chamber 36 through opening 48.

Also in communication with chamber 36 is relief port 50 and lower weep hole 51 so that any fluid within chamber 36 can flow out through relief passage 52 formed in valve body 12 (especially since flow out through check valve 49 is prohibited). Generally, relief passage 52 will be threaded for subsequent coupling to a hose or pipe (not shown) acting as the return hydraulic line. The fluid flow out of chamber 36 via relief port 50 and/or weep hole 51 is controlled by needle valve 54 having an end shaped or sized to seal against relief port 50 in order to block and/or control such flow as desired. Weep hole 51, on the other hand, is not so blocked thereby continuously permitting the passage of fluid between chamber 36 and relief passage 52. However, weep hole 51 is sized considerably smaller than relief port 50 so that any such fluid flow through weep hole 51 would be rather small.

Figure 2:
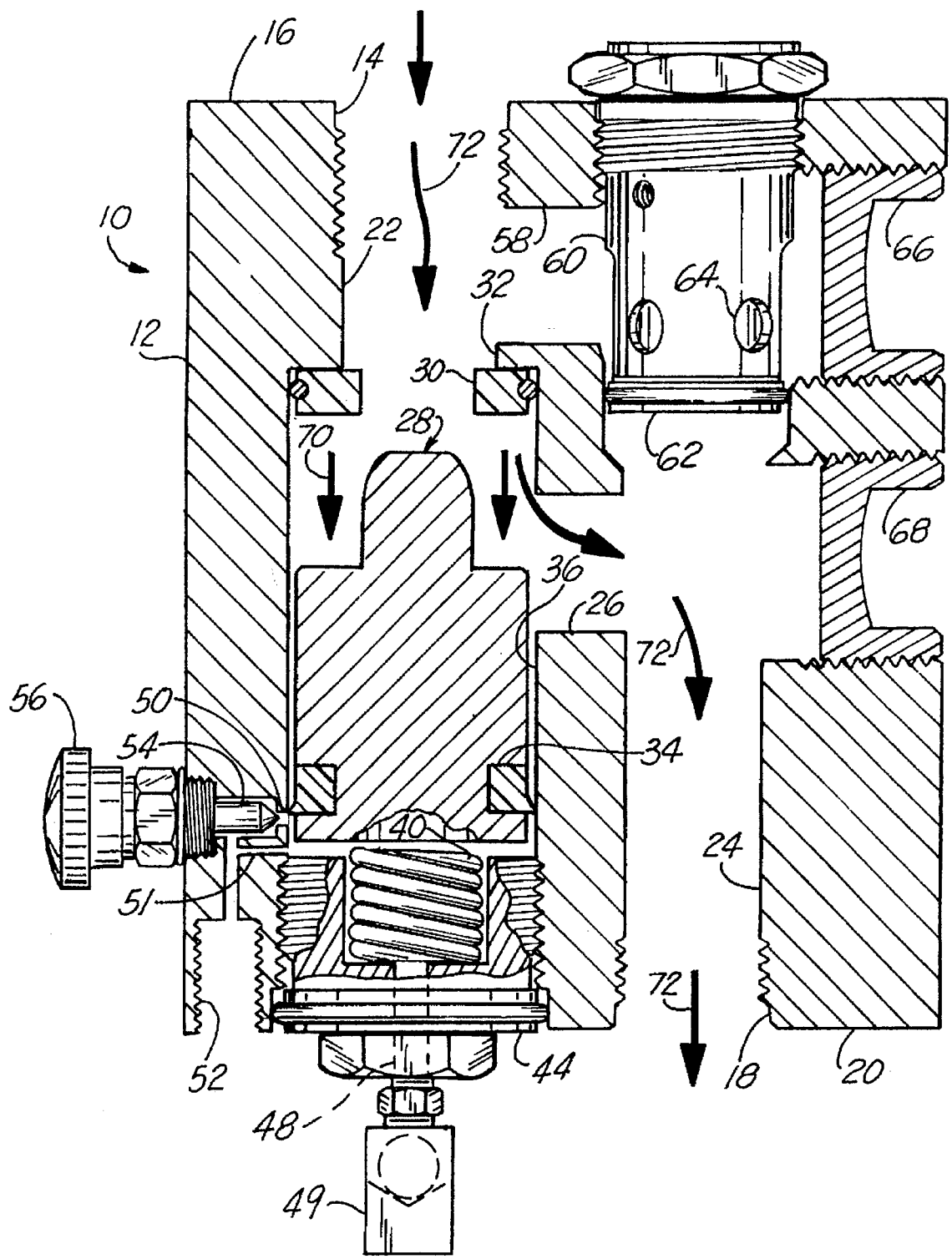
FIG. 2 is a pictorial sectional view of the invention illustrating its operation under an initial surge in fluid pressure in the forward direction; and, FIG. 3 is a pictorial sectional view of the invention illustrating its operation during normal forward flow or equilibrium conditions.
Figure 3:
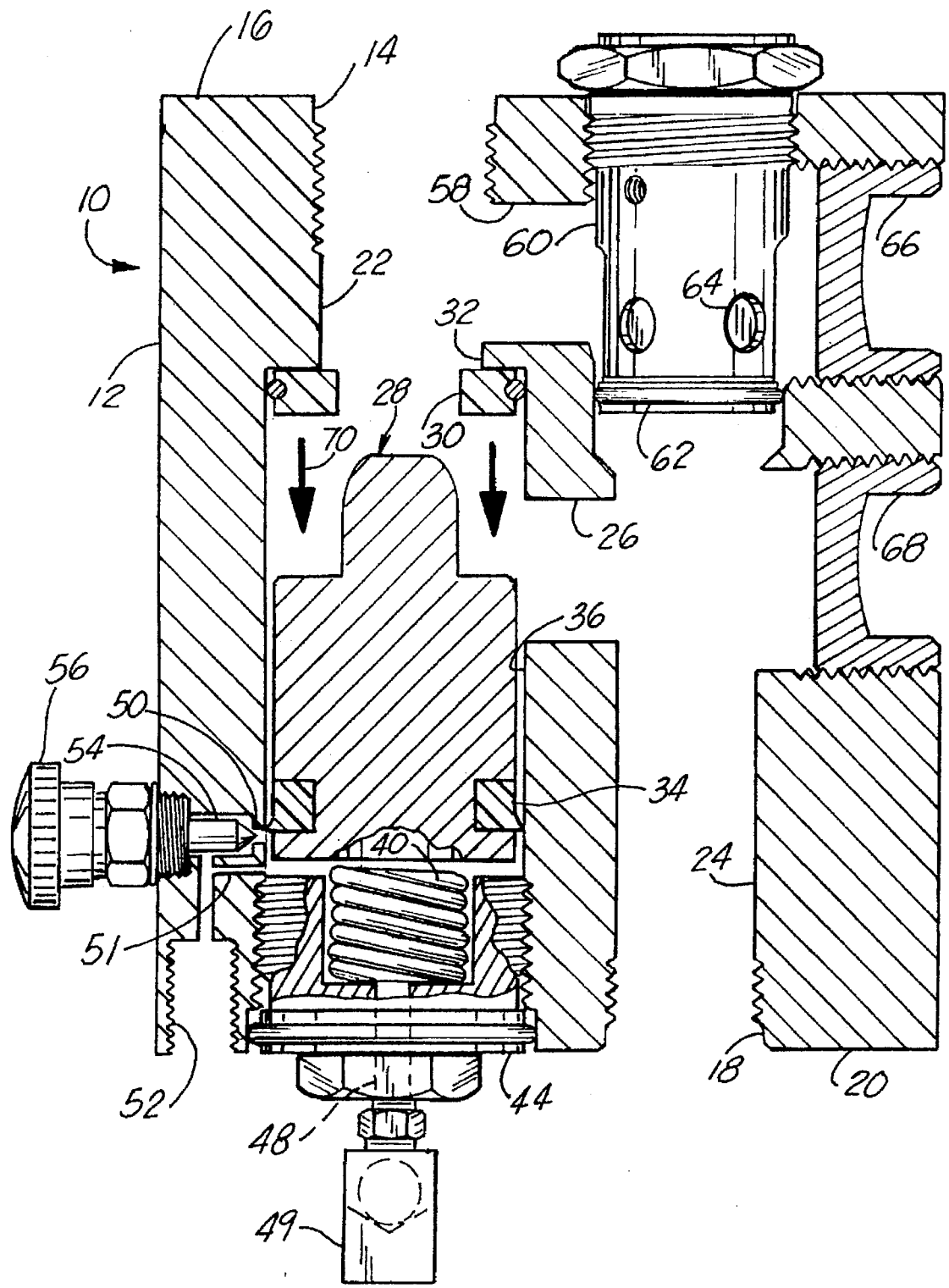

Needle valve 54 is constructed in the normal fashion with knurled knob 56 extending outside valve body 12. This knob 56 is rotated in the normal manner to move needle valve 54 with respect to relief port 50 as is required or desired. Consequently, knob 56 can be rotated from outside valve body 12 in order to move needle valve 54 to either the fully blocked or the fully unblocked position (with respect to relief port 50) or any position therebetween, as is illustrated in FIGS. 1–3.

Inlet bore 22 is also configured with a second or adjacent side passageway 58 terminating at ball check valve 60. Check valve 60 is positioned to block any flow from inlet bore 22 through side passage 58 and into outlet bore 24. This is accomplished by gasket 62 sealing check valve 60 against outlet bore 24 as shown. Instead, as will be explained below, check valve 60 only permits fluid to flow in the opposite or reverse flow direction from outlet bore 24 into a lower region of valve 60 and out openings 64 into side passageway 58 for subsequent discharge into inlet bore 22. Check valve 60 is spring biased so that it is normally in the closed position of FIGS. 2 and 3; but, is opened (FIG. 1) when sufficient pressure comes to bear on its lower region from outlet bore 24. Upper and lower plugs 66 and 68 adjacent check valve 60 are constructed for optional use, such as for pressure gauges or the like, to ascertain the pressure or flow within valve body 12.

As shown in FIG. 1, under no-flow conditions, plunger 28 and ball check valve 60 will both be positioned in their closed positions. Thus, no fluid will be allowed to pass from inlet bore 22 to outlet bore 24. But, as shown in FIG. 2, as fluid and fluid pressure begins to build up upon plunger 28 (as indicated by ARROWS 70), plunger 28 is pushed or retracted into chamber 36. For such retraction to occur, however, the bias of spring 40 (if such spring 40 is employed) must be overcome and any fluid within chamber 36 must first be forced out through relief port 50 and/or weep hole 51. The rate of removal of such fluid from chamber 36 is not immediate, thus, plunger 28 does not respond immediately to any surge pressure acting upon it from inlet bore 22. Instead, the movement or retraction of plunger 28 is dampened by the fluid in chamber 36 whose removal rate is controlled by needle valve 54 (such removal rate being varied by the rotation of knob 56). Thus, no pressure surge is allowed to be passed onto the fluid passing into outlet bore 24.

Furthermore, the tip 29 of plunger 28 extending through opening 32 is tapered so that upon initial retraction of plunger 28, only a small quantity of such pressurized fluid is permitted to pass through opening 32. However, as plunger 28 is allowed to retract further, a greater portion of opening 32 and transverse passage 26 becomes unblocked, thereby gradually permitting more pressurized fluid to pass therethrough into outlet bore 24 (see ARROWS 72). As the pressure upon plunger 28 increases even further, plunger 28 becomes further retracted within chamber 36, thereby permitting even more fluid to flow into outlet bore 24 while at the same time preventing any pressure or flow surge from also passing to outlet bore 24. Thus, the flow of fluid to outlet bore 24 varies depending upon the pressure upon plunger 28. Of course, the pressure of the fluid within chamber 36 is less than that in inlet bore 22 otherwise plunger 28 would not retract. This is due to relief passage 52 being coupled to a return hydraulic line and the pressure differential that will arise from such fluid passing from relief port 50 to relief passage 52.

Because of such operation of control valve 10, downstream equipment can be operated in the normal fashion. However, should a surge in fluid flow or pressure occur, control valve 10 will become operational to prevent such pressure or flow surges from reaching this downstream equipment, thereby possibly damaging such equipment. This is accomplished by the controlled release of fluid from within chamber 36 via needle valve 54. Also, as indicated above, the incoming pressurized fluid from inlet port 14 that acts on plunger 28 does not immediately shift plunger 28 downwardly. Instead, plunger 28 only gradually moves from its seat 30 and only gradually uncovers transverse passage 26. Thus, no sudden pressure surge from inlet port 14 is passed along to outlet bore 24 and hence to the downstream equipment. Such gradual movement of plunger 28 is due to the slow, controlled release of fluid from chamber 36 via needle valve 54 to a return line.

FIG. 3 illustrates the operation of control valve 10 during normal flow conditions or just as equilibrium is reached between inlet bore 22 and outlet bore 24. In this situation, plunger 28 is fully retracted (maximum downward movement) due to the pressure acting upon it. FIG. 1, on the other hand, discloses the operation of control valve 10 under no-flow or reverse flow conditions. In the equilibrium or normal flow case of FIG. 3, fluid and pressure is transmitted fully through valve body 12 via passageway 26. However, once equilibrium is reached and fluid no longer flows through valve body 12, fluid will slowly begin to enter chamber 36 after first passing through check valve 49 and inlet opening 48. Such fluid now entering chamber 36 will generally be at the same pressure as the fluid entering outlet port 18. Spring 40 (if employed) will provide sufficient additional force to once again bias plunger 28 against seat 30, thereby re-sealing transverse passage 26 and blocking any flow therethrough (i.e. returning to the position of FIG. 1). Thus, plunger 28 will be repositioned to absorb the next pressure surge arriving through inlet port 14 (should one occur) in order to protect the downstream equipment. Consequently, once equilibrium is reached or passed, plunger 28 returns to its original closed position since no more fluid is flowing in the forward direction and passing through transverse passage 26.

During the reverse flow or no-flow situation of FIG. 1, plunger 28 will be biased against seat 30, thereby sealing opening 32 as well as sealing transverse passage 26. Pressurized fluid having previously entered chamber 36 via inlet opening 48 through one-way check valve 49 (which blocks fluid flow in the opposite direction) will pressurize chamber 36 in order to continuously bias plunger 28 against seat 30. This inlet opening 48 is normally coupled to the fluid now passing into outlet bore 24 such that the two will generally be at the same pressure. Such fluid entering outlet port 18 will thus be blocked from passing through transverse passage 26 and instead will push against the lower portion of valve 60 (see ARROWS 74). Once sufficient pressure comes to bear upon this lower portion of valve 60, its internal spring bias (not shown) will be overcome thereby opening and permitting such pressurized fluid to pass through openings 64 and into side passage 58 before passing into inlet port 14 and out valve 10 (see ARROWS 74).

As can be seen, no surge protection is available in this reverse flow scenario, thus, it is preferable for two such control valves 10 to be used in those situations where surge protection is desired in both flow directions.

A method of blocking surge pressure in a fluid line is taught and comprises the steps of constructing and arranging a valve body 12 with an inlet port 14 and associated bore 22 and a separate outlet port 18 and associated bore 24; installing a transverse passage 26 within valve body 12, passage 26 coupling inlet bore 22 with outlet bore 24; blocking passage 26 between inlet bore 22 and outlet bore 24 via a plunger assembly 28 in fluid connection with inlet bore 22; normally biasing plunger assembly 28 in the blocking position; constructing and arranging a fluid-filled chamber 36 within valve body 12 for receiving plunger assembly 28 therein when plunger assembly 28 is retracted to an unblocking position, chamber 36 having first and second openings therein; coupling a needle valve assembly to the first opening in chamber 36 to selectively control the flow of fluid through the first opening and out chamber 36 when plunger assembly 28 is retracted; and, coupling a check valve 49 to the second opening and arranging check valve 49 to permit fluid to pass therethrough and fill chamber 36, thereby biasing plunger assembly 28 in the blocking position. The method further comprises the step of positioning the passage in a central region of valve body 12. The method further comprises the step of normally biasing plunger assembly 28 via a spring assembly secured to said plunger assembly. The method further comprises the step of constructing a weep hole 51 adjacent to and generally parallel with the first opening. The method further comprises the step of installing a one-way valve assembly in fluid communication with outlet bore 24 for receiving fluid therefrom and selectively permitting same to pass into inlet bore 22. The method further comprises the step of coupling the outlet of the one-way valve assembly to a second passage within valve body 12, the second passage being coupling to inlet bore 22. The method further comprises the step of constructing and arranging the needle valve assembly with a rotatable knob located outside valve body 12 for adjusting the position of the needle valve assembly with respect to the first opening. Thus, the method of the present invention for blocking surge pressure in a fluid line comprises the steps of: constructing and arranging a valve body with an inlet port and associated bore and a separate outlet port and associated bore; installing a passage within the valve body, the passage coupling the inlet bore with the outlet bore; blocking the passage between the inlet bore and the outlet bore via a plunger assembly in fluid connection with the inlet bore; normally biasing the plunger assembly in the blocking position; constructing and arranging a fluid-filled chamber within the valve body for receiving the plunger assembly therein when the plunger assembly is retracted to an unblocking position, said chamber having first and second openings therein; coupling a needle valve assembly to the first opening in the chamber to selectively control the flow of fluid through the first opening and out the chamber when the plunger assembly is retracted; coupling a check valve to the second opening and arranging the check valve to permit fluid to pass therethrough and fill the chamber, thereby biasing the plunger assembly in the blocking position; sealing the plunger assembly with respect to the inlet bore with a first sealing assembly and sealing the plunger assembly with respect to the chamber with a second sealing assembly, the passage normally opening onto the plunger assembly intermediate the first and second sealing assemblies; constructing and arranging the inlet bore and outlet bore generally parallel to each other; constructing and arranging the passage and the second passage generally parallel to each other and generally transverse to the inlet and outlet bores; coupling the check valve and the one-way valve assembly to opposite ends of adjacent said bores; and, forming a part of the first sealing means with a seat assembly against which the plunger assembly is biased to seal the inlet bore.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A fluid pressure surge protector comprising:
   (a) a valve body having an inlet port and associated bore and a separate outlet port and associated bore;
   (b) a passage positioned within a central region of said valve body coupling said inlet bore with said outlet bore;
   (c) plunger means in fluid connection with said inlet bore for blocking said passage between said inlet bore and said outlet bore;
   (d) spring bias means acting upon said plunger means for normally biasing said plunger means in the blocking position;
   (e) a fluid-filled chamber for receiving said plunger means therein when said plunger means is retracted to an unblocking position, said chamber having first and second openings therein;
   (f) needle valve means coupled to said first opening in said chamber for selectively controlling the flow of fluid through said first opening and out said chamber when said plunger means is retracted;
   (g) a check valve coupled to said second opening and arranged to permit fluid to pass therethrough and fill said chamber thereby biasing said plunger means in the blocking position; and,
   (h) a separate weep hole adjacent to and generally parallel with said first opening.

2. The apparatus as set forth in claim 1, further comprising one-way valve means in fluid communication with said outlet bore for receiving fluid therefrom and selectively permitting same to pass into said inlet bore.

3. The apparatus as set forth in claim 2, wherein said one-way valve means comprises an outlet coupled to a second passage within said valve body, said second passage coupling to said inlet bore.

4. The apparatus as set forth in claim 3, wherein said needle valve means comprises a rotatable knob located outside said valve body for adjusting the position of said needle valve means with respect to said first opening.

5. The apparatus as set forth in claim 4, further comprising first sealing means for sealing said plunger means with respect to said inlet bore and comprising second sealing means for sealing said plunger means with respect to said chamber, said passage normally opening onto said plunger means intermediate said first and said second sealing means.

6. The apparatus as set forth in claim 5, wherein said inlet bore and said outlet bore are generally parallel to each other.

7. The apparatus as set forth in claim 6, wherein said passage and said second passage are generally parallel to each other and are generally transverse to said inlet and said outlet bores.

8. The apparatus as set forth in claim 7, wherein said check valve and said one-way valve means are coupled to opposite ends of adjacent said bores.

9. The apparatus as set forth in claim 8, further comprising a seat assembly forming a part of said first sealing means against which said plunger means is biased to seal said inlet bore.

10. A method of blocking surge pressure in a fluid line comprising the steps of:
   (a) constructing and arranging a valve body with an inlet port and associated bore and a separate outlet port and associated bore;
   (b) installing a passage within said valve body, said passage coupling said inlet bore with said outlet bore;
   (c) blocking said passage between said inlet bore and said outlet bore via a plunger assembly in fluid connection with said inlet bore;
   (d) normally biasing said plunger assembly in the blocking position;
   (e) constructing and arranging a fluid-filled chamber within said valve body for receiving said plunger assembly therein when said plunger assembly is retracted to an unblocking position, said chamber having first and second openings therein;
   (f) coupling a needle valve assembly to said first opening in said chamber to selectively control the flow of fluid through said first opening and out said chamber when said plunger assembly is retracted;

(g) coupling a check valve to said second opening and arranging said check valve to permit fluid to pass therethrough and fill said chamber thereby biasing said plunger assembly in the blocking position; and, (h) positioning said passage in a central region of said valve body;

(i) normally biasing said plunger assembly via a spring assembly secured to said plunger assembly;

(j) constructing a weep hole adjacent to and generally parallel with said first opening.

11. The method as set forth in claim 10, further comprising the step of installing a one-way valve assembly in fluid communication with said outlet bore for receiving fluid therefrom and selectively permitting same to pass into said inlet bore.

12. The method as set forth in claim 11, further comprising the step of coupling the outlet of said one-way valve assembly to a second passage within said valve body, said second passage being coupling to said inlet bore.

13. The method as set forth in claim 12, further comprising the step of constructing and arranging said needle valve assembly with a rotatable knob located outside said valve body for adjusting the position of said needle valve assembly with respect to said first opening.

14. A method of blocking surge pressure in a fluid line comprising the steps of:

(a) constructing and arranging a valve body with an inlet port and associated bore and a separate outlet port and associated bore;

(b) installing a passage within said valve body, said passage coupling said inlet bore with said outlet bore;

(c) blocking said passage between said inlet bore and said outlet bore via a plunger assembly in fluid connection with said inlet bore;

(d) normally biasing said plunger assembly in the blocking position;

(e) constructing and arranging a fluid-filled chamber within said valve body for receiving said plunger assembly therein when said plunger assembly is retracted to an unblocking position, said chamber having first and second openings therein;

(f) coupling a needle valve assembly to said first opening in said chamber to selectively control the flow of fluid through said first opening and out said chamber when said plunger assembly is retracted;

(g) coupling a check valve to a second passage within said valve body and said second opening and arranging said check valve to permit fluid to pass therethrough and fill said chamber thereby biasing said plunger assembly in the blocking position;

(h) sealing said plunger assembly with respect to said inlet bore with a first sealing assembly and sealing said plunger assembly with respect to said chamber with a second sealing assembly, said passage normally opening onto said plunger assembly intermediate said first and said second sealing assemblies;

(i) constructing and arranging said inlet bore and said outlet bore generally parallel to each other;

(j) constructing and arranging said passage and said second passage generally parallel to each other and generally transverse to said inlet and said outlet bores;

(k) coupling said check valve and said outlet bore to opposite ends of adjacent said bores; and, (l) forming a part of said first sealing assembly with a seat assembly against which said plunger assembly is biased to seal said inlet bore.

* * * * *